Dec. 24, 1946.   R. E. McCARTHY ET AL   2,413,149
PORTABLE DERRICK
Filed June 28, 1944   8 Sheets-Sheet 1
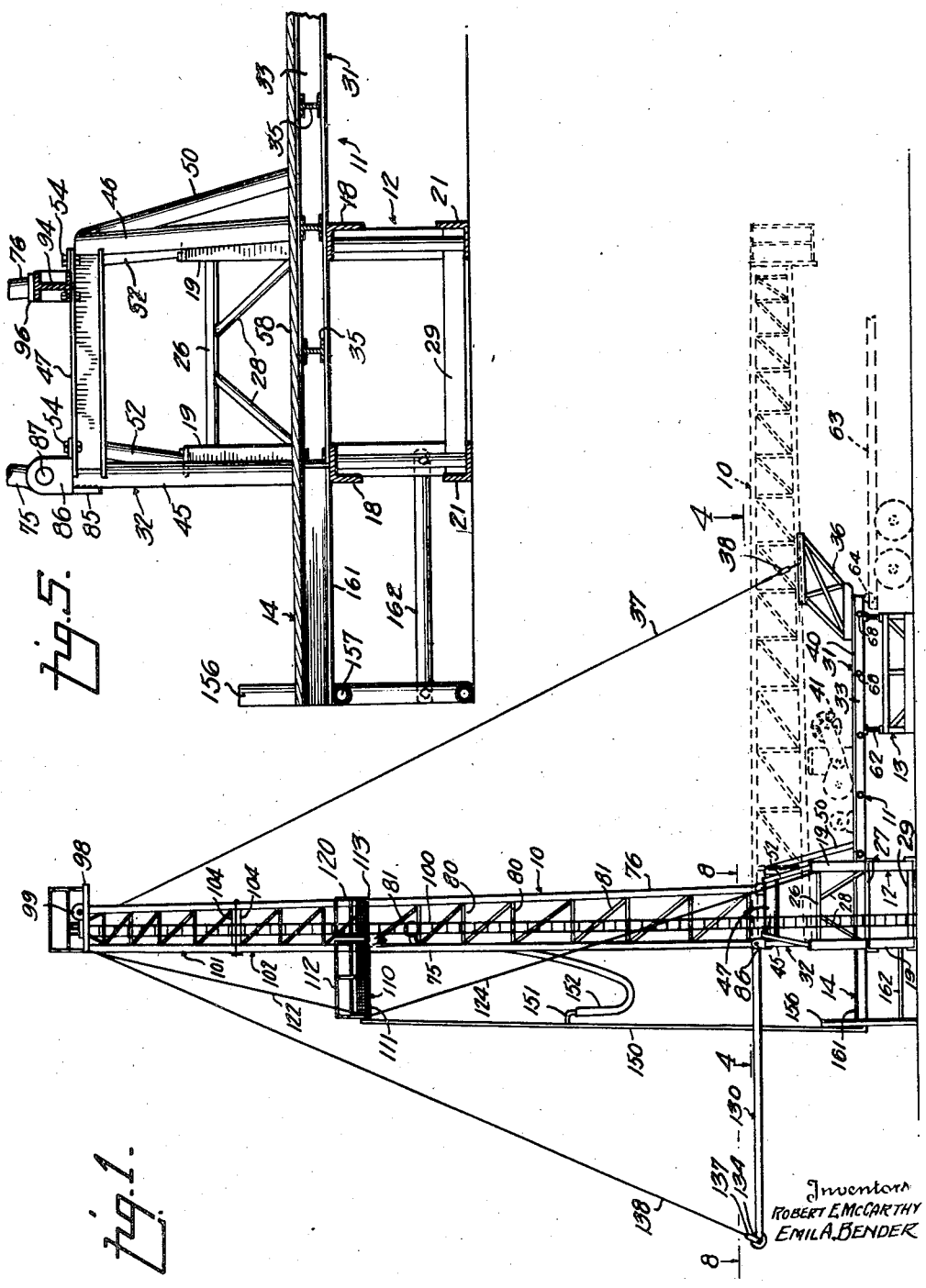

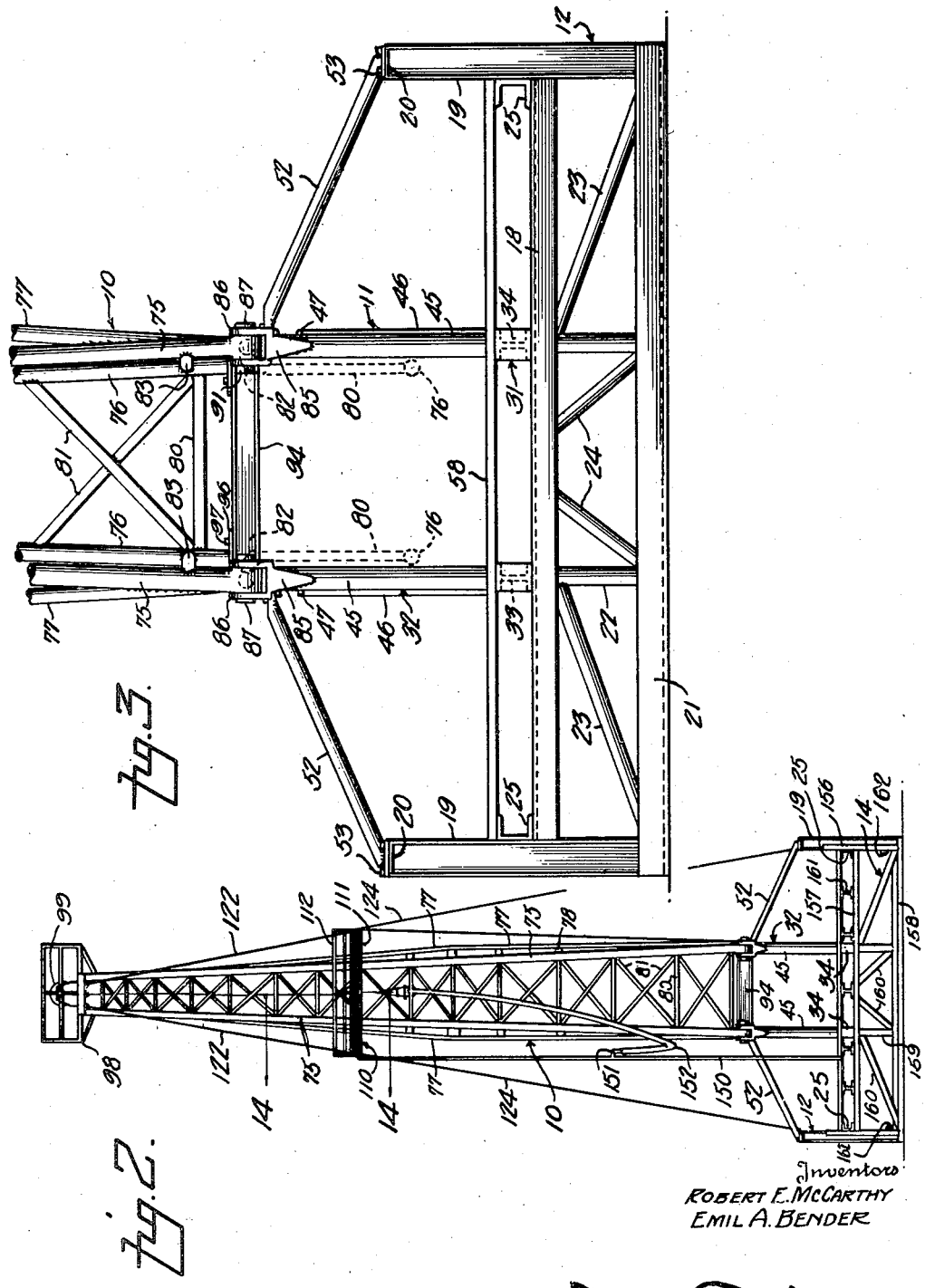

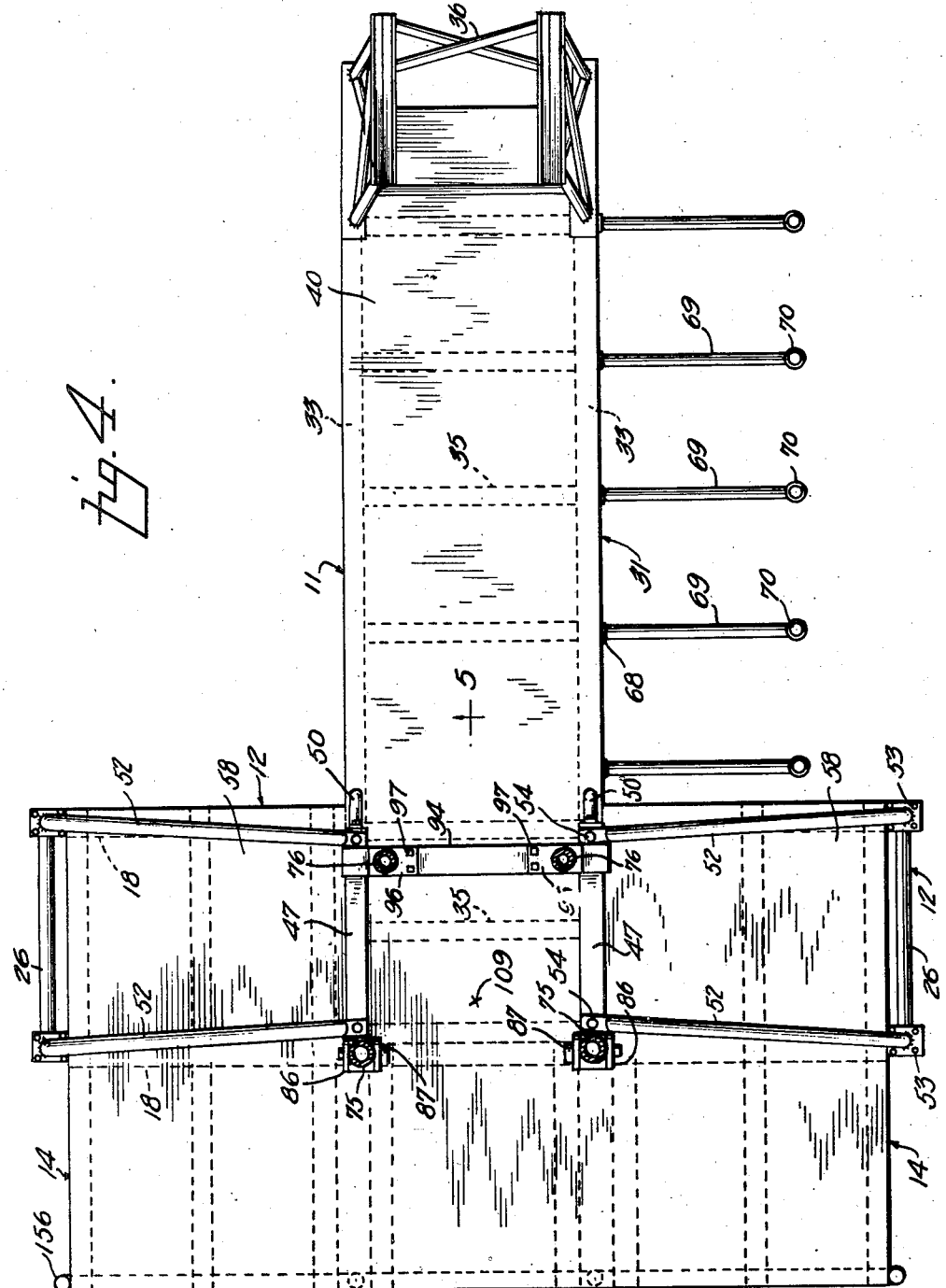

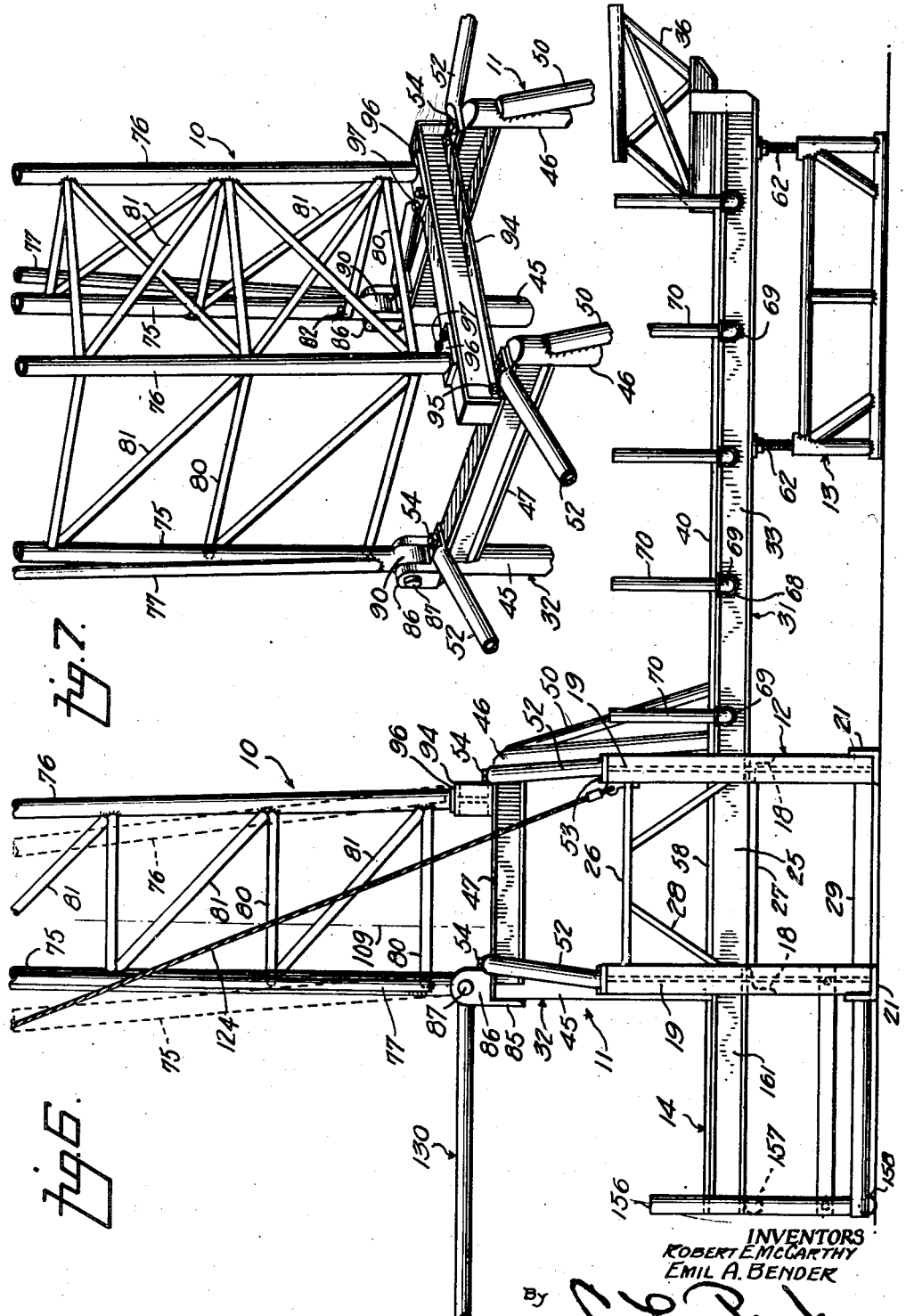

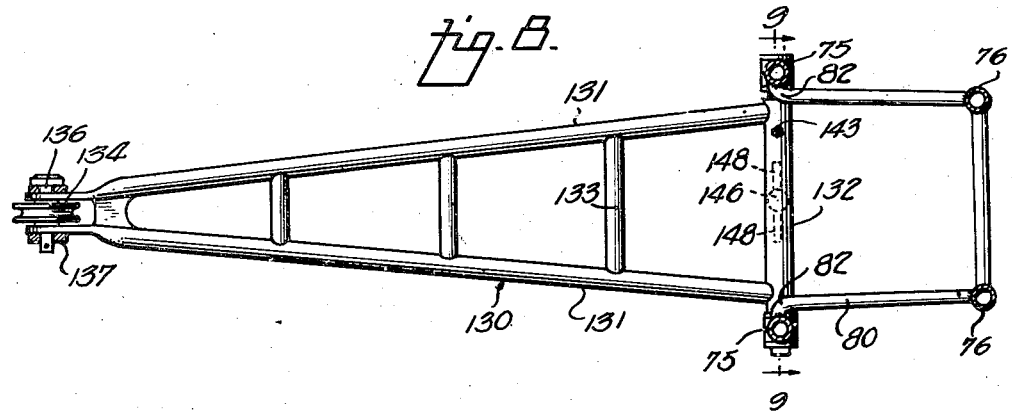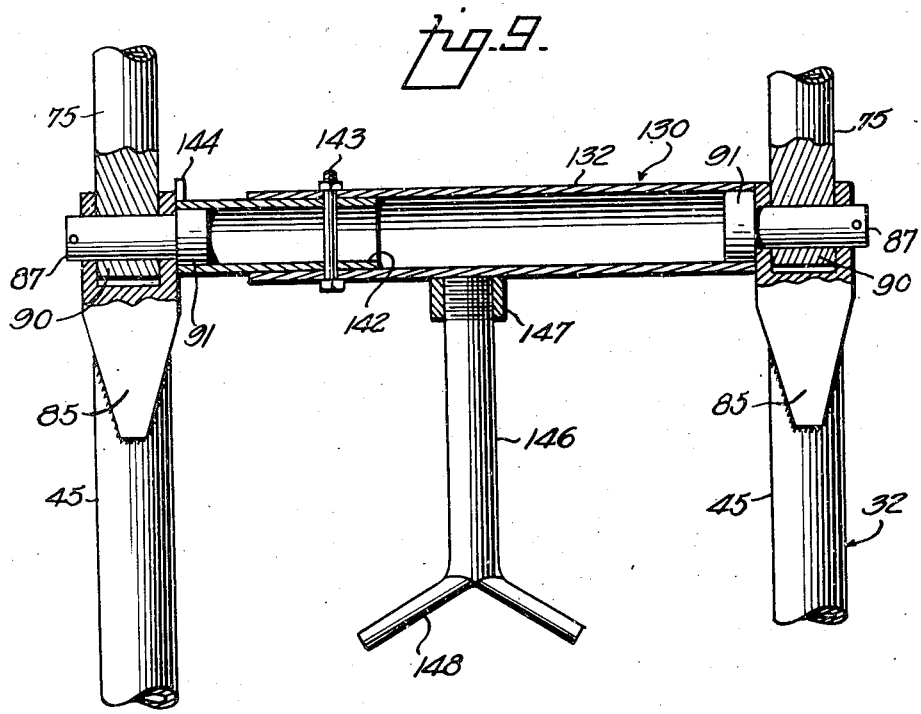

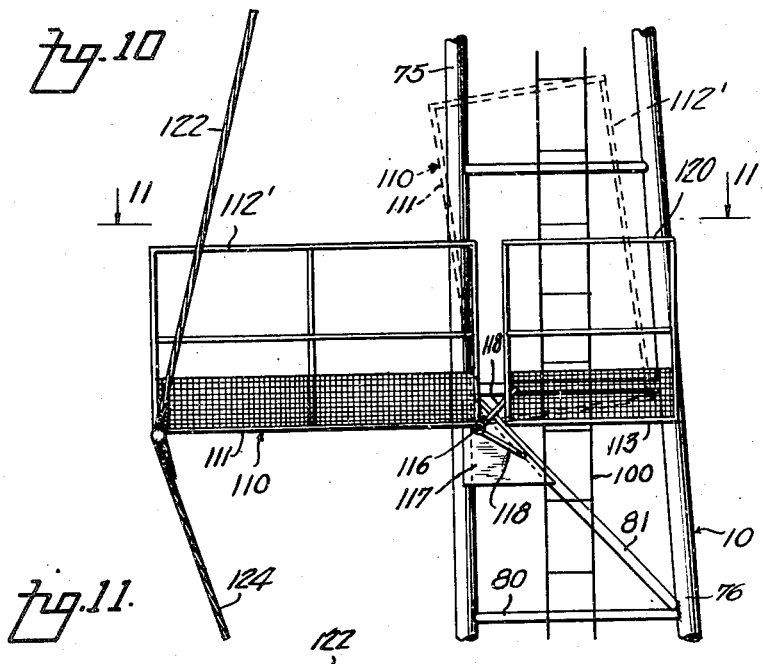
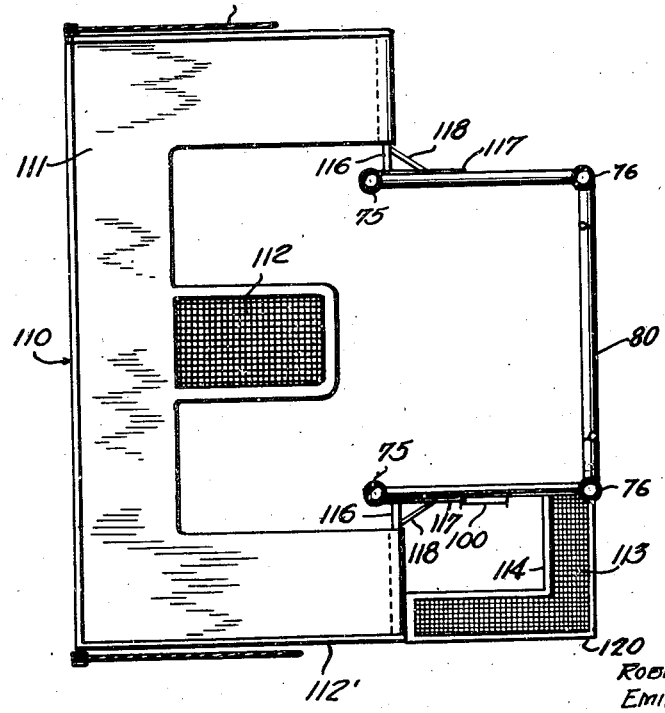

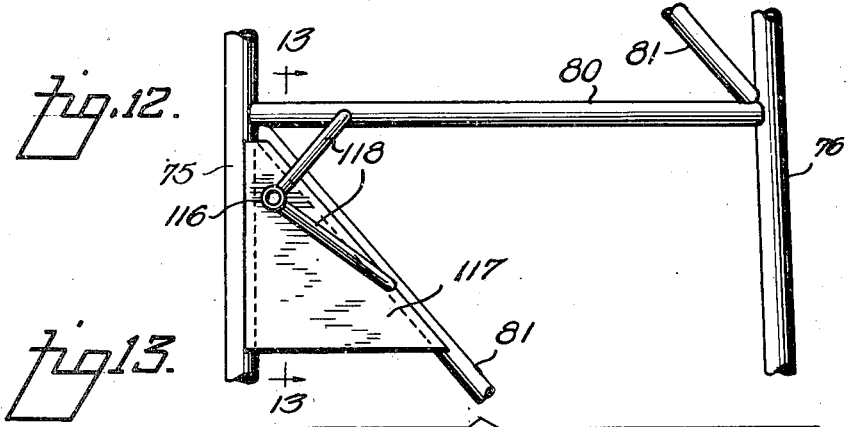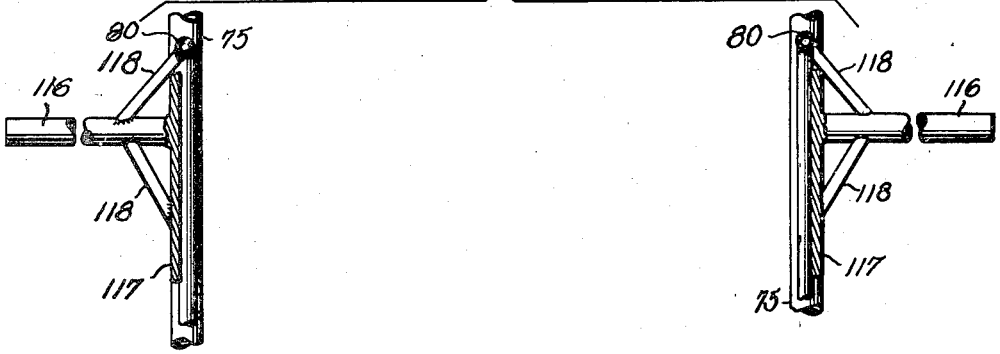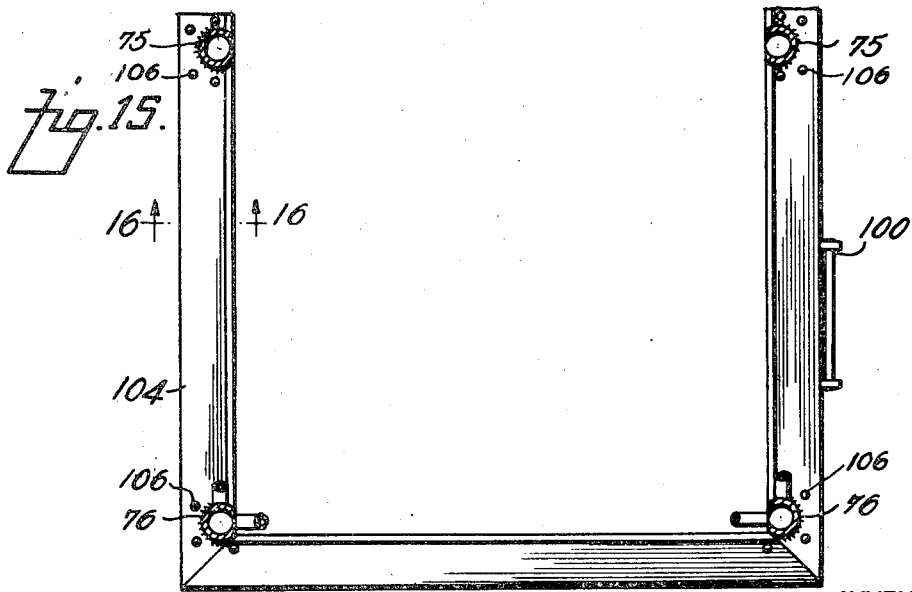

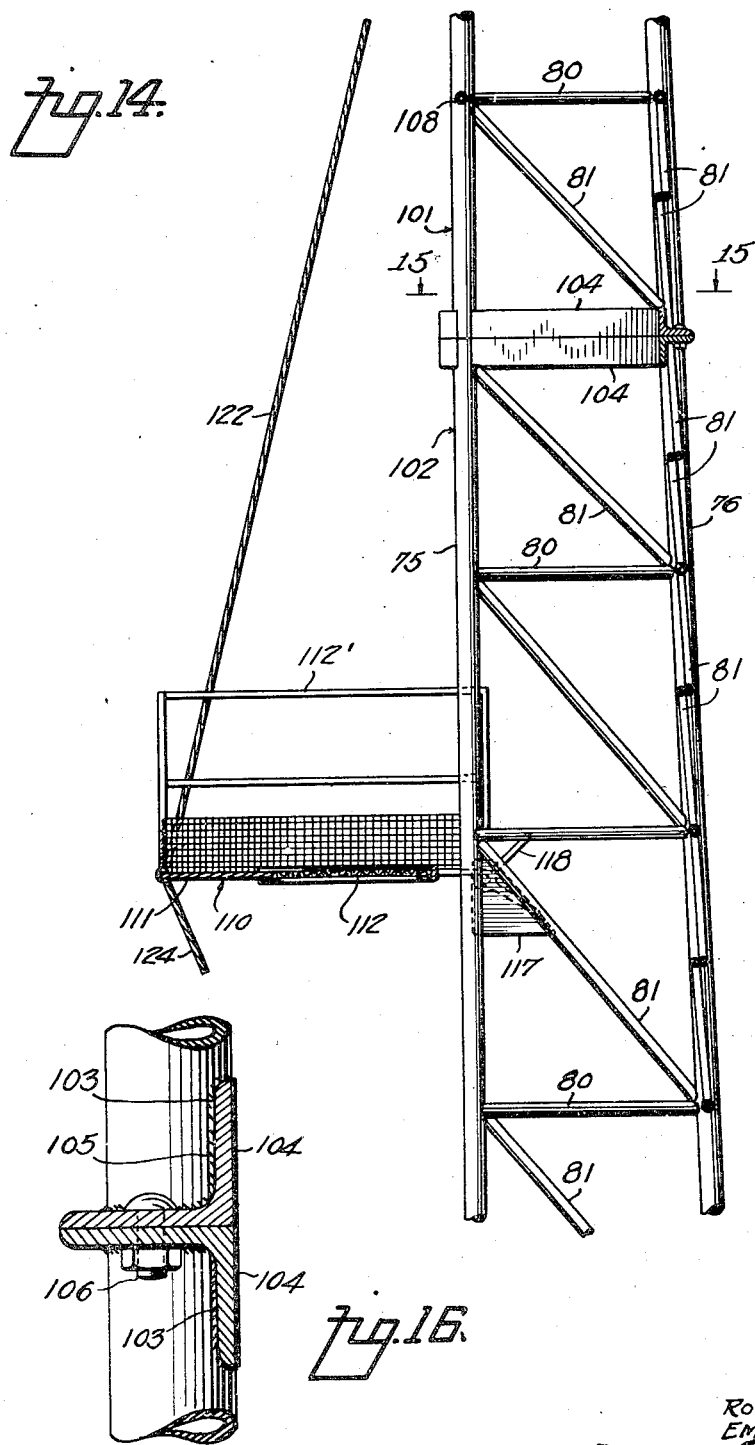

Patented Dec. 24, 1946

2,413,149

UNITED STATES PATENT OFFICE 2,413,149

PORTABLE DERRICK

Robert E. McCarthy, Bakersfield, and Emil A. Bender, Long Beach, Calif.

Application June 28, 1944, Serial No. 542,552

14 Claims. (Cl. 189—16)

This invention relates to a portable derrick, and is a continuation-in-part of our application Serial No. 473,934, filed January 29, 1943.

An important object of the invention is to provide a readily transportable derrick structure, particularly for drilling oil wells, wherein the derrick body is hinged in a novel and highly advantageous manner to a base structure so as to be readily raised to operative position or lowered to an inoperative position for transporting the structure.

A further object is to provide such an arrangement wherein a highly rigid derrick structure is provided by virtue of the structure of the derrick itself and the base structure, and the arrangement of the derrick proper relative to the base structure, without the use of substantial guying means.

A further object is to provide such a structure wherein the derrick proper is hinged to the front side of an upstanding supporting base so that when the derrick proper is swung to horizontal position, a portion thereof swings in between opposite sides of the upstanding base structure, the overall height of the structure when the derrick proper is in horizontal position thus being minimized while at the same time permitting the use of an upstanding base structure of substantial height which is advantageous in the performing of work during the well drilling operation, etc.

A further object is to provide such an arrangement wherein the derrick proper may be swung upwardly to and slightly beyond the vertical operative position, whereupon preferably a transverse supporting member may be arranged across the back side of the upstanding base structure and the derrick proper then lowered into position with the free legs thereof arranged on the horizontal supporting member.

A further object is to provide a structure of the character referred to which may be readily set up in operative position and which is provided with a substantially T-shaped supporting structure, the derrick being supported at the center of the cross of the T, and the leg of the T, particularly with a load thereon, serving to counterweight the derrick structure during operation of the derrick.

A further object is to provide an arrangement wherein an upstanding base structure and a main sub-base are so arranged as to facilitate the rigid bracing of the upstanding base structure, the latter being of sufficient height to provide the maximum possible clear working space on the derrick floor and minimizing the length of the derrick proper in order to extend the latter to a given height above the ground.

A further object is to provide a derrick structure of the type referred to wherein the axis or center line of the well hole lies wholly within the horizontal limits of the derrick from end to end thereof, thus substantially reducing lateral strains on the derrick.

A further object is to provide such a derrick structure wherein the front side of the derrick and the upstanding base structure are open to provide for the moving of drill pipe into the derrick, the structure of the parts being such that the derrick proper possesses ample strength even though the front side thereof is left open for the purpose stated.

A further object is to provide a portable derrick structure which is capable of being readily transported, and which can be readily unloaded and set up in position, the main sub-base being positioned and the base and derrick being then secured to the main substructure, after which an auxiliary sub-base is placed in position to support the end of the horizonal base remote from the derrick proper.

A further object is to provide a novel derrick combination including a fourble board hinged to the derrick proper to swing away from the derrick to a horizontal position, together with guying means associated with the fourble board and with the derrick proper and main sub-base so as to support the fourble board in operative position and at the same time add to the stability of the derrick proper.

Other objects and advantages of the invention will become apparent during the course of the following description.

In the drawings we have shown one embodiment of the invention. In this showing:

Figure 1 is a side elevation of the derrick structure as a whole, a portion of the transporting trailer being shown in dotted lines and the derrick proper being shown in dotted lines in its horizontal position, Figure 2 is a front elevation of the derrick structure, Figure 3 is an enlarged fragmentary front elevation showing the lower portion of the derrick proper, the upstanding base structure and the main sub-base, the pipe platform being omitted, Figure 4 is an enlarged horizontal sectional view on line 4—4 of Figure 1, the raising boom being omitted, Figure 5 is a fragmentary vertical sectional view on line 5—5 of Figure 4, Figure 6 is an enlarged fragmentary side elevation of the lower portion of the apparatus, Figure 7 is an enlarged fragmentary perspective view showing the adjacent portions of the derrick proper and the upstanding supporting base therefor, together with the associated elements, Figure 8 is an enlarged horizontal sectional view taken substantially on line 8—8 of Figure 1 showing the raising boom and the derrick proper, the base structures being omitted, Figure 9 is an enlarged detail fragmentary sectional view on line 9—9 of Figure 8, Figure 10 is an enlarged fragmentary side elevation of the fourble board and the adjacent portions of the derrick structure and associated elements, Figure 11 is a horizontal sectional view on line 11—11 of Figure 10, Figure 12 is an enlarged fragmentary elevation of the hinge mounting for the fourble board and the associated portions of the derrick proper, Figure 13 is a section on line 13—13 of Figure 12, Figure 14 is an enlarged fragmentary vertical sectional view, taken substantially on line 14—14 of Figure 2 through the fourble board and the adjacent portions of the derrick proper, Figure 15 is an enlarged horizontal sectional view on line 15—15 of Figure 14, and Figure 16 is an enlarged fragmentary sectional view on line 16—16 of Figure 15.

Referring to the drawings, it will be noted that the present apparatus comprises four main structures or units, namely, the derrick proper indicated by the numeral 10, a base indicated by the numeral 11, a main sub-base 12 and an auxiliary sub-base 13, the numerals referred to indicating the respective units as a whole. A pipe platform indicated as a whole by the numeral 14 comprises a fifth unit but forms, per se, no part of the present invention.

The sub-base 12 comprises an upper pair of spaced parallel structural members 18, preferably of angle section, connected at their ends to relatively heavy upstanding posts 19, preferably of I-beam section, closed at their upper ends as at 20. The posts 19 extend a substantial distance above the members 18 as clearly shown in Figure 3. The bottoms of the posts 19 are connected by frame members 21 also preferably formed of angle section. The members 21 each have one flange horizontally arranged to seat upon the surface of the ground. The members 18 and 21 are braced with respect to each other by intermediate posts 22 and by suitable angle braces 23 and 24. Transversely of the frame members 18 the sub-base may be provided with channel members 25 secured to the posts 19 and to the members 18 to brace these members with respect to each other and for an additional purpose to be described. At each end of the substructure, the posts are connected by horizontal bars 26 and 27 and angle members 28 cooperate with the members 26 and 27 to form, in effect, a rail at each end of the sub-base and to form additional bracing and support for the posts 19. The bottoms of each pair of posts are connected by a suitable structural connecting member 29 (Figure 6).

The base structure 11 comprises a horizontal structure indicated as a whole by the numeral 31 and an upstanding structure indicated as a whole by the numeral 32. The horizontal base structure 31 comprises a pair of horizontal parallel structural members 33 preferably in the form of I-beams which may be closed at their front ends as at 34 (Figure 3). The members 33 are connected by spaced transverse structural elements 35 (Figures 4 and 5). The end of the horizontal structure 31 remote from the derrick is provided with a cradle 36 the specific structure of which is not of particular importance. This cradle supports the free end of the derrick proper 10 when the latter is in horizontal position as shown in dotted lines in Figure 1. The cradle 36 is rigidly anchored to the rails 33 and a guy line 37 is connected between the cradle and the upper or free end of the derrick. This guy line is provided with a conventional turnbuckle 38 for a particular reason to be referred to.

Suitable planking 40 is arranged on and across the base members 33 to form a working platform and to act as a support, for example, for a drawworks 41 (Figure 1). The particular type of drawworks is of no importance so far as the present invention is concerned. It will be apparent that a drawworks may be designed to be shipped with the base structure and the derrick proper as a unit package, the drawworks in such case being of such height that the derrick proper will clear it when in horizontal position. If desired, any standard drawworks may be used which is of such height that it cannot be shipped as a part of the unit package, and such drawworks will be installed after the election of the derrick. In either case, the drawworks, if used on the platform 40, serves as a counterweight to stabilize the derrick as will become more apparent later.

The upstanding base 32 comprises spaced forward legs 45 (see particularly Figures 3, 6 and 7), and generally similar spaced rear legs 46. These legs may be made of any suitable structural material and piping has been illustrated in the drawings. The legs 45 are free of connection with each other and the same is true of the legs 46, each leg 45 being connected at its upper end to the corresponding leg 46 by a horizontal structural member 47 preferably formed of I-beam section. The members 47 are formed at their ends to fit the legs 46 and are preferably welded thereto. As shown in Figure 3, the back legs 46 are spaced apart a distance slightly greater than the legs 45. The structural members 47 are parallel to each other, these members being in direct alinement with the legs 46 and being slightly off-center with respect to the legs 45. In other words, the web of the beam forming each member 47 is in the axial plane of the corresponding leg 46 but slightly offset from the plane of the axis of the corresponding leg 45.

Each of the legs 46 is braced longitudinally with respect to the horizontal base 31 by angle braces 50 welded at their upper ends to the legs 46 and at their lower ends to the base members 33. The angularity of these braces and the slight inclination of the legs 46 from the vertical as shown in Figure 5 lends extreme rigidity to the base 32 longitudinally with respect to the horizontal base 31. All of the structural members involved in the making of the base 31 are heavy so as to provide ample strength and rigidity. To add rigidity longitudinally of the sub-base 12, that is, at right angles to the length of the horizontal base 31, relatively heavy rigid angle braces 52 are connected between the members 47 and the upper ends of the posts 19. One end of each of the braces 52 is bolted as at 53 to the upper end of each post 19, and the other end of each brace 52 is bolted as at 54 to the corresponding end of the adjacent member 47. These braces, therefore, rigidly brace the upper end of the vertical base 32 with respect to the sub-base. The posts 19 are heavy structural elements and are rigidly braced with respect to each other by the various members 18, 21, 22, 23 and 24 (Figure 3) and accordingly it will be apparent that the vertical base 32 is rigidly fixed against any movement transversely of the apparatus. The substantial length of the sub-base 12 together with the rigid bracing means referred to thus provides ample lateral stability in the derrick proper. Moreover, it will be apparent that the base 32 is of substantial height and size and provides clear working space therewithin, the flooring 40 extending into the upstanding base 32 and across the sub-base 12, as indicated by the numeral 58.

The auxiliary sub-base 13 supports the free end of the horizontal base 31, as will be apparent. The sub-base 13 may be formed preferably in generally rectangular form horizontally and may be made of any desired type of structural elements. The auxiliary sub-base corresponds generally in width to the horizontal base 31 and is provided at each corner thereof with jack screws 62 (Figure 1) adjustable to level the horizontal base 31 and to lift the latter from the bed of the trailer 63 on which the assembly is hauled to the site. This trailer may be of any conventional type and prior to the complete withdrawing of the trailer, the latter has its rear end occupying the position shown in Figure 1 until the auxiliary sub-base 13 has been set in place as will be described more in detail later. For the purpose of assisting in removal of the apparatus from the trailer, the bed of the latter, if desired, may be provided with rollers, only one of which need be employed at the rear end of the trailer and indicated by the numeral 64. As a matter of fact, this roller is not essential since the apparatus may be "skidded" from the bed of the trailer as will become apparent.

One or both of the base members 33 may be provided with collars 68 welded or otherwise fixed thereto and horizontal pipes 69 may be threaded thereinto and provided with upstanding guard ends 70. The pipes 69 may be used for any desired purpose. For example, boards may be laid on these pipes to provide a catwalk along the side of the horizontal base.

The derrick proper 10 comprises a pair of front legs 75 and a pair of rear legs 76, the former of which may be braced, if desired, as at 77 by struts welded at their ends to the legs 75 and spaced therefrom by blocks 78 (Figure 2). This bracing of the legs 75 is wholly a matter of choice. As clearly shown in Figure 8, the legs 75 have at least their lower end portions spaced apart a distance greater than the spacing of the corresponding portions of the legs 76 in order that the latter may swing downwardly into the space between the base legs 45 and 46 as shown in dotted lines in Figure 3. Except for the front side of the derrick, as will be referred to later, the legs 75 and 76 are connected by suitable girts and braces 80 and 81. The lower of these girts and braces extend squarely into the legs 76 and have their other ends curved into the legs 75 as at 82, see particularly Figure 8. Thus the girts and braces at the sides of the derrick throughout the portion thereof which will be arranged within the legs 45 and 46 when the derrick is in horizontal position are offset inwardly to clear the structural connections 47 and the legs 45 and 46.

Each of the legs 45 is provided at its upper end with a saddle 85 providing a bearing 86 to receive a pivot pin 87. The saddles 85 seat on the upper ends of the legs 45 and extend downwardly therealong at the front side thereof and are rigidly welded in position. The pivot pins 87 extend through bearings 90 carried by the lower ends of the derrick legs 75 and are provided with relatively thick cylindrical heads 91 (Figure 9) for a purpose to be described. The pivotal connections referred to serve to hinge the derrick proper to the upstanding base structure 32.

The derrick legs 75 are preferably arranged substantially in vertical alinement with the base legs 45 as clearly shown in Figure 7, while the derrick legs 76 lie inwardly of the base legs 46. The supporting of the unhinged side of the derrick when the latter is in its vertical operative position is preferably accomplished by a relatively heavy structural member 94, preferably in the form of an I-beam, placed across the members 47 and bolted thereto as at 95 (Figures 4 and 7). The lower ends of the legs 76 are provided with plates 96 preferably welded thereto and bolted as at 97 to the member 94 after the latter is placed in position in a manner to be described. The support 94 is heavy and rigid and adequately supports the free back side of the derrick as will be apparent. The member 94 preferably lies adjacent the ends of the braces 52 as shown in Figure 7.

The derrick is provided with a conventional platform 98 and the usual crown block assembly 99, and preferably with a ladder 100, as well as the usual accessories and appurtenances for the carrying out of the well drilling operations.

As previously stated, the front side of the derrick is open up to a point to be referred to, the girts and braces 80 and 81 being connected between the legs of the derrick at the back and both sides thereof throughout the length of the derrick. The front side of the derrick is open for the entrance into the derrick of the usual drill pipe sections, the pipe sections being fed into the well as drilling progresses, in the customary manner.

It will be apparent that the derrick proper may be made as a single assembly, or it may be made in two or more sections if necessary or advisable in transporting the structure. In the present instance the derrick has been shown in two sections generally indicated in Figure 14 by the numerals 101 and 102. These sections are joined together by the means shown in Figures 14, 15 and 16. When tubular derrick legs are employed, as shown in the drawings, the adjacent ends of the legs of the sections 101 and 102 are cut away as at 103 to fit angle iron members 104, these members being reversed with respect to each other and welded to the derrick legs as at 105. The members 104 extend across the derrick between the legs 76 at the back side of the derrick and between the legs 75 and 76 at the sides of the derrick, if it is desired to leave the front side of the derrick open at least to the height of the plane of connection of the derrick sections 101 and 102 in the embodiment of the invention illustrated. The contacting flanges of the angle members 104 may be bolted together as at 105 (Figure 16) to rigidly secure the derrick sections 101 and 102 to each other. In the arrangement shown, the line of girts 80 next above the members 104 extend around all four sides of the derrick, the front side of the derrick thus being open to such point, the first girt across the front side of the derrick, defining the upper end of the open side of the derrick, being indicated by the numeral 108 in Figure 14.

Particular attention is invited to the fact that regardless of the structural elements employed for making the derrick, and regardless of whether the derrick is made in one or more separable sections, the structure and arrangement of parts are such that the axis or center line of the well hole lies within the horizontal limits of the derrick from end to end thereof, as indicated by the numeral 109 (Figures 4 and 6). It is the more or less common practice in portable derrick structures to place the lower end of the derrick at a point laterally offset from the well with the derrick inclined toward its upper end toward a point in vertical alinement with the center of the well hole. Such an arrangement sets up substantial stresses in the derrick body which is not true of the present construction, the latter functioning substantially the same as permanent derrick structures arranged directly over the well.

The derrick is provided with a forble board for the usual purpose, namely, for the stacking of the upper ends of the pipe sections to be moved into the derrick proper. The fourble board is indicated as a whole by the numeral 110 and comprises a U-shaped platform 111 having a central inwardly extending platform portion 112. The outer sides of the platform section 111 are railed in any suitable manner as at 112'. The fourble board further comprises a side section 113, fixed to the adjacent legs 75 and 76, and having an opening 114 through which a workman can climb out onto the fourble board from the ladder 100. The fourble board is used in the conventional manner when in operative position, the platform 112 serving to divide the drill pipes in sections lying between the platform 112 and the sides of the fourble board, and serving as a working platform.

The fourble board 110 is supported by outstanding trunnions 116 at the sides of the derrick. Each trunnion 116 is carried by a gusset plate 117 welded in position against the adjacent derrick elements, each trunnion 116 being provided with angle braces 118 welded to the adjacent girt and brace 80 and 81. One of the trunnions 116 also serves to support the platform 113, the rear end of this platform being suitably secured to the adjacent derrick leg 76. For the purpose of safety, the platform 113 also may be railed as at 120.

In shipping the derrick, the fourble board will be swung about the trunnions 116 to the inoperative position shown in dotted lines in Figure 10, the platform 113 being secured in position after the fourble board 110 has been moved to its horizontal operative position. The rail 112' is preferably removable to permit the fourble board to be swung substantially flat against the body of the derrick. At the corners of the fourble board remote from the derrick body, guy lines 122 are connected, these lines (Figures 1, 2, 10 and 14) converging toward each other and toward the derrick and being connected to the latter adjacent its upper end. From the same corners of the fourble board, a pair of guy lines 124 (Figure 2) extend downwardly and rearwardly and have their lower ends connected preferably to the rear posts 19 of the main substructure. The guy lines 124 diverge downwardly from each other, as shown in Figure 2, and are connected to the main sub-base at substantially widely spaced points rearwardly of the points of connection of the guy lines with the fourble board. It will be apparent that the guy lines 122 and 124 serve several functions, namely, of fixing the fourble board 110 in proper position and of trussing and guying the derrick proper so as to substantially increase the lateral and torsional stability of the derrick.

Means are provided for raising the derrick from horizontal to vertical position, such means being directly associated with the means for pivoting the derrick on the pins 87. Referring particularly to Figures 6, 8 and 9, the numeral 130 designates a raising boom as a whole comprising legs 131 welded or otherwise secured at one end to a heavy sleeve 132. From this sleeve the legs 131 diverge toward their opposite ends and are suitably braced at intervals as at 133. The smaller end of the boom is provided with a sheave 134. This sheave is mounted on a shaft 136 to which is also connected a yoke 137, shown in section in Figure 8 for the purpose of illustration. A cable 138 is connected between the yoke 137 and any suitable point at the top of the derrick 10. The cable 138 obviously limits swinging movement of the boom 130 and derrick 10 to positions approximately perpendicular to each other. Suitable cable lines run around the sheave 134 and around other suitable sheaving and to a windlass to provide pulling means for raising the derrick, such pulling means forming no part per se of the present invention and not being illustrated.

The sleeve 132 (Figure 9) is of a length slightly less than the distance between the heads 91 of the hinge pins 87. One end of the sleeve 132 receives one of the heads 91 and the other end of the sleeve carries an inner slidable sleeve 142 one end of which, when in operative position, receives the other head 91, the latter head being somewhat smaller than the other head 91 in view of the different diameters of the sleeves 132 and 142. A bolt 143 extends through the sleeves 132 and 142 to fix them against axial movement with respect to each other. Accordingly the raising boom is pivoted on the pins 87 which pivotally connect the derrick 10 to the legs 45.

The boom remains so connected to the derrick structure until after the derrick has been raised, as will become apparent, after which the bolt 143 may be removed and the sleeve 142 slid inwardly to clear the adjacent pin 91. A stop member 144 may be carried by the sleeve 142 to limit its inward sliding movement into the sleeve 132 and to act as a fingerpiece for conveniently sliding the sleeve 142 to and from its operative position.

What may be termed an auxiliary raising boom is carried by the sleeve 132. Such auxiliary raising boom is indicated by the numeral 146 and may be threaded in a sleeve 147 welded to the sleeve 132. The member 146 is forked at its free end as at 148 for a purpose to be described.

The present apparatus provides novel means for supplying mud through the drill pipe as is customary during the drilling operation. The means ordinarily employed for this purpose comprises a hose hung within the derrick ready for use and subject to injury during the drilling operations. In the present case a pipe 150 is anchored at its upper end to the fourble board 110 (Figure 1) and at its lower end to any suitable support, for example, a pipe platform to be referred to later. Mud is supplied through the pipe 150 and through a nipple 151 carried thereby to a conventional rubber or similar hose 152 the free end of which is connected to the usual swivel. The body of the hose is largely arranged outside the derrick and is thus protected from injury during all drilling operations.

The present construction may be conveniently provided with a pipe platform 14, as previously indicated. This platform comprises suitable corner posts 156 spaced forwardly of the main sub-base 12 and rigidly connected by vertically spaced horizontal structural members 157 and 158, which may be in the form of piping. These horizontal members are suitably fixed and braced with respect to each other by intermediate vertical posts 159 and angle braces 160. Horizontal structural members 161 are laid parallel to each other with one end supported on the horizontal member 157 and with their other ends supported on the adjacent structural member 18 of the main substructure 12. Lower tie members 162 are connected between the posts 19 and 156 as shown in Figures 1 and 5. The platform 58 (Figure 4) may be extended to the front of the pipe platform 14. The pipe 150 may be suitably connected to the platform 14 if such structure is employed.

The operation of the apparatus is as follows:

The derrick 10 and sub-base 11, including the horizontal and vertical structures 31 and 32 and the cradle 36, ordinarily are assembled into a single unit package for shipment on the trailer 63 to the site at which the derrick is to be set up. The fourble board 110 will be folded to the dotted line position shown in Figure 10, while the boom 130 will be swung to horizontal position in the open side of the derrick 10, the latter unit, of course occupying the horizontal dotted line position shown in Figure 1 during shipment of the unit. In order to minimize the height of the vehicle and load, the auxiliary boom 146 (Figure 9) will be unscrewed and secured anywhere in the unit package, since it will be apparent that with the derrick in horizontal position the auxiliary boom will project upwardly above the open side of the horizontal derrick. The other elements of the apparatus, such as the sub-bases 12 and 13, the elements of the pipe platform 14, the pipe 150 and associated elements, etc., will make up a separate package unit to be shipped to the site on another trailer. While the height between the horizontal base 31 (Figure 1) and the bottom side of the horizontally arranged derrick ordinarily will be insufficient for installing on the horizontal base a conventional drawworks, it will be apparent that a special drawworks can be, and in fact has been, designed for installation on the horizontal base 31 as indicated in dotted lines in Figure 1. Thus the drawworks may be shipped as part of the unit package including the derrick and base structures. Of course, the height of the vertical base 32 may be increased to provide space for a conventional drawworks on the base 31, but this is not recommended since it is desirable to minimize road clearances. Assuming that the derrick is not of exceptional height, a unitary derrick structure may be shipped on the trailer 63, or a sectional derrick structure may be employed with the upper and lower sections assembled before shipment, as shown in Figures 14, 15 and 16. If desired or necessary, the sectional derrick arrangement may be employed and the upper derrick section may be shipped as a separate package or shipped together with the sub-bases 12 and 13, etc.

In setting up the derrick at the site, the sub-base 12 will first be positioned on the ground, the latter being levelled to whatever extent may be necessary. With the top of the sub-structure 12 arranged at a height not exceeding the height above the ground of the bottom of the horizontal base 31, the trailer 12 will be backed into position ajacent the sub-base. In this connection attention is invited to the fact that the horizontal base 31 overhangs or projects from the rear end of the bed of the trailer a distance at least equal to the width of the sub-base 12 as viewed in Figure 1. That portion of the structure to be deposited on the sub-base 12 therefore is free to be moved into position thereover. The trailer 63 is maneuvered until the left hand end of the base 31 as viewed in Figure 1 is in position on the sub-base 12, whereupon the horizontal I-beams 33 are suitably bolted to the structural members 18 of the sub-base 12. The bolts are left relatively loose to facilitate the withdrawing of the trailer 63. The tractor (not shown) is then driven forwardly to leave the overhanging portion of the horizontal base 31 in position on the sub-base 12.

The trailer is slowly driven to the point shown in dotted lines in Figure 1 with the end of the horizontal base remote from the derrick supported on the rear end of the trailer. The auxiliary sub-base 13 is then inserted in position beneath the rails 33, and the jack screws 62 are turned up into engagement with the rails 33 at least sufficiently to lift the load from the trailer 63. This vehicle then may be driven away, and whatever levelling of the base and sub-base structures may be necessary is done prior to the elevation of the derrick. Preferably the ground is levelled transversely of the base 11 so that the sub-base 12 stands in proper position, and the horizontal base 31 may be levelled by manipulation of the jack screws 62.

The heavy braces 52 are then arranged in the positions shown and bolted to the substructure legs 19 and to the members 47. These braces rigidly fix the vertical base 32 against any lateral movement with respect to the sub-base 32. It will be understood, of course, that after the trailer 63 has been driven away, the bolts for connecting the beams 33 to the sub-base 12 will be tightened, and accordingly the entire base structure 11 and the sub-base 12 will become a rigid integrated unit.

The auxiliary boom 146 is then screwed into position and with the raising boom 130 horizontally arranged in the open upper side of the horizontal derrick 10, the auxiliary boom 146 will project upwardly. A line is run through the forked end 148 of the auxiliary raising boom and connected to any suitable point adjacent the remote end of the boom 130, and this line is pulled by a suitable winch to swing the boom 130 upwardly to vertical position. The line 138, which may have been connected in the assembling of the apparatus prior to shipment or connected just before raising the derrick, will limit turning movement of the boom 130 to a position perpendicular to the horizontal derrick. The boom will therefore stand vertically. Suitable lines passing around the sheave 134 may be passed around suitable remote sheaving and to a suitable winch, which may be the drum of the drawworks and the operation of the winch exerts a pull on the upper end of the boom 130 which is transmitted through the line 138 to the free end of the derrick 10 to swing the latter to vertical position.

The guy line 37 will have been previously connected in position between the cradle 36 and the upper end of the derrick and the turnbuckle 38 will have been loosened to an extent which will permit the derrick, when elevated, to swing slightly past the vertical position shown in solid lines in Figure 1. The elevating winch is stopped when the slack has been taken out of the guy line 37, whereupon the supporting beam 94 (Figure 7) will be elevated into position on the members 47 and bolted thereto. The winch is then released to permit the lower ends of the legs 76 to move downwardly to bring the plates 96 into engagement with the beam or supporting member 94, whereupon the plates 96 are bolted to the member 94 as at 97. The turnbuckle 38 is then tightened and the lower ends of the legs 76 will be tightly held downwardly in engagement with the top of the beam 94.

The lines 122 (Figures 1 and 2) preferably will have been connected between the derrick top and the fourble board 120 in assembling the structure before shipment, while the guy lines 124 preferably will have been connected to the fourble board with their lower ends left free. After the erection of the derrick as stated, the fourble board may be swung downwardly from the dotted line position shown in Figure 10 to the solid line position, whereupon the lines 124 will be connected to the posts 19 and tightened in any suitable manner. The lines 122 and 124 not only fix the fourble board 120 in proper position, but they also act to lend substantial lateral and torsional stability to the derrick structure 10.

After the derrick has been thus erected, the line 138 (Figure 1) may be removed, whereupon the bolt 143 (Figure 9) will be removed from the sleeves 132 and 142 to permit the latter to slide into the sleeve 132. The sleeve 132 then may be moved toward the left as viewed in Figure 9 until it is free of its associated head 91, whereupon the entire raising boom structure may be removed from the apparatus. It will be apparent, therefore, that the pivot pins 87 serve the two functions of pivotally supporting the derrick 10 and of anchoring the front side thereof, and of supporting the raising boom in position before and during the raising of the derrick.

The various other accessories and appurtenances then may be connected or assembled with respect to the apparatus such, for example, as the catwalk supporting pipes 69 (Figure 4), the pipe platform 14, etc. The pipe 150 (Figures 1 and 2) is then connected between the fourble board and the pipe platform 14, ready for use in supplying mud to the drill pipe during the drilling operation. As previously stated, the hose 152 may be conveniently supported externally of the derrick until needed, thus eliminating the usual injuries to such hose.

The assembling of the derrick sections 101 and 102 (Figure 14) when such sectional construction is required will be obvious. The upper section 101 will be assembled and bolted with respect to the derrick section 102 before the derrick is elevated. In such case, the guy lines 122 leading upwardly from the fourble board 110 will be connected at their lower ends to the fourble board preferably before shipment, and will be secured to the upper end of the derrick section 101 prior to the raising of the derrick.

It will be apparent that the lower ends of the legs 76 of the derrick are free to swing into and out of the vertical base structure 32, the lower ends of the legs 76 being spaced apart a distance less than the spacing of the legs 46. The girts and braces 80 and 81 at the sides of the lower end portion of the derrick will extend forwardly from the legs 76 in parallel planes and will turn outwardly at their forward ends as at 82 for connection with the legs 75. Thus the lowermost girts and braces are so positioned as not to interfere with the swinging of the bottom portion of the derrick into the upstanding base section 32. Thus it will be apparent that the derrick is free to be assembled with respect to the upstanding base 32 in horizontal position for shipment, and is free to swing upwardly to the vertical operative position without interference between the derrick and the base structure 12.

The derrick is used conventionally and its use need not be specifically referred to. The arrangement of the parts is such that the derrick possesses a high degree of rigidity and stability. The height of the upstanding base 32 is important for several reasons. In the first place, it provides an open and unimpeded working space for and around the rotary table, and it permits the use of downwardly angularly extending heavy braces 52 by means of which the base structure 32 may be rigidly braced laterally of the derrick. The latter feature is of importance since it positively anchors the lower end of the legs 75 which define the open side of the derrick, the front legs of the derrick being disconnected from each other for a substantial portion of the height of the derrick. Moreover, the height of the base structure 32 is such that no portion of the derrick projects above the base 32 when in the horizontal inoperative position in which the apparatus is shipped.

The use of the supporting beam 94 is quite simple, and this member provides adequate rigid support for the back side of the derrick. The swinging of the derrick slightly beyond its vertical position permits the beam 94 to be readily and quickly placed into position, this operation being preferably performed by elevating the beam through the medium of suitable tackle hung from some portion of the back side of the derrick above the bottoms of the legs 76.

The assembled structure is such that the base structure 31 and the main sub-base 12 are substantially T-shaped, the upstanding base 32 being arranged centrally of the greater horizontal dimension of the substructure 12. This structure therefore substantially increases the lateral stability of the derrick structure. The length of the horizontal base 31 is important for several reasons. For example, it provides an adequate supporting base for the assembled unit on the trailer 63 and permits such unit to be conventionally skidded onto and off the trailer 63. Even more important is the fact that the horizontal base structure 31 provides a convenient platform on which the drawworks may be located, and the length of the horizontal base and the weight of the drawworks thereon provides adequate counterweighting for the derrick structure against forces tending to tip the derrick forwardly.

In some installations it may be desirable to mount the drawworks on either platform 58 (Figure 4) between the upstanding base 12 and a pair of the posts 19. If this expedient is resorted to, the horizontal base 31 may be suitably ballasted, for example, by locating a tank of water thereon to insure the counterweighting of the derrick structure.

The fourble board 110 is utilized in the conventional manner for supporting additional drill pipe sections to be moved into the derrick when needed. These pipe sections will be stacked in the fourble board on opposite sides of the platform 112 (Figure 11) and the pipe sections are utilized, when desired, in the well known manner. As stated, the angularly arranged guy lines 122 and 124 serve to fix the fourble board in position and to add to the strength and stability of the derrick 10.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A portable derrick structure comprising an upstanding base having spaced opposite pairs of legs, a derrick body, means for pivotally supporting one side of said derrick body on two opposite legs of said pairs, releasable means for supporting the side of said derrick opposite said pivot means with respect to the other opposite legs of said pairs, said upstanding base and the lower portion of said derrick body being constructed and arranged with respect to each other for the swinging of such lower portion of said derrick body into the space between said opposite pairs of legs, said derrick normally extending substantially vertically upwardly with its lower end terminating substantially in a common plane with the top of said base, a substructure on which said upstanding base is arranged and which extends substantially beyond said opposite pairs of legs, and rigid brace means extending from said substructure upwardly and inwardly on opposite sides of said base and connected to the latter.

2. A portable derrick structure comprising an upstanding base having a front side and a back side, said upstanding base comprising opposite spaced pairs of legs, rigid horizontal members connecting the upper ends of the legs of each pair, a derrick body, means for pivotally connecting said derrick body to the front side of said upstanding base, and a rigid supporting member extending across the top of said base adjacent the back side thereof and supported on said horizontal members, the lower end of said derrick body adjacent the back side of said base bearing on said supporting member, said supporting member being removable and said upstanding base and the lower portion of said derrick body being constructed and arranged with respect to each other for the reception of such lower derrick portion in the space between said opposite pairs of legs when said derrick body is swung downwardly about the axis of said pivot means.

3. A portable derrick structure comprising an upstanding base having a front side and a back side, said upstanding base comprising opposite spaced pairs of legs, rigid horizontal members connecting the upper ends of the legs of each pair, a derrick body, means for pivotally connecting said derrick body to the front side of said upstanding base, a rigid supporting member extending across the top of said base adjacent the back side thereof and supported on said horizontal members, the lower end of said derrick body adjacent the back side of said base bearing on said supporting member, said supporting member being removable and said upstanding base and the lower portion of said derrick body being constructed and arranged with respect to each other for the reception of such lower derrick portion in the space between said opposite pairs of legs when said derrick body is swung downwardly about the axis of said pivot means, a substructure on which said upstanding base is supported, said substructure being elongated and extending a substantial distance on opposite sides of said pairs of legs, and brace means connected between the sides of said base and said substructure at each side of said upstanding base.

4. A portable derrick structure comprising an upstanding base having a front side and a back side, said upstanding base comprising opposite spaced pairs of legs, rigid horizontal members connecting the upper ends of the legs of each pair, a derrick body, means for pivotally connecting said derrick body to the front side of said upstanding base, a rigid supporting member extending across the top of said base adjacent the back side thereof and supported on said horizontal members, the lower end of said derrick body adjacent the back side of said base bearing on said supporting member, said supporting member being removable and said upstanding base and the lower portion of said derrick body being constructed and arranged with respect to each other for the reception of such lower derrick portion in the space between said opposite pairs of legs when said derrick body is swung downwardly about the axis of said pivot means, a substructure on which said upstanding base is supported, said substructure being elongated and extending a substantial distance on opposite sides of said pairs of legs, brace means connected to said substructure at each side of said upstanding base and extending upwardly and inwardly and connected to the adjacent side of said base at the top thereof, and an elongated horizontal base structure fixed with respect to said upstanding base and extending from the back side thereof substantially perpendicular to said substructure.

5. A portable derrick structure comprising an upstanding base having a front side and a back side, said upstanding base comprising opposite spaced pairs of legs, rigid horizontal members connecting the upper ends of the legs of each pair, a derrick body, means for pivotally connecting said derrick body to the front side of said upstanding base, a rigid supporting member extending across the top of said base adjacent the back side thereof and supported on said horizontal members, the lower end of said derrick body adjacent the back side of said base bearing on said supporting member, said supporting member being removable and said upstanding base and the lower portion of said derrick body being constructed and arranged with respect to each other for the reception of such lower derrick portion in the space between said opposite pairs of legs when said derrick body is swung downwardly about the axis of said pivot means, a substructure on which said upstanding base is supported, said substructure being elongated and extending a substantial distance on opposite sides of said pairs of legs, rigid brace means connected to said substructure at each side of said upstanding base and extending upwardly and inwardly and rigidly connected to the adjacent side of said base at the top thereof, an elongated horizontal base structure fixed with respect to said upstanding base and extending from the back side thereof substantially perpendicular to said substructure, a guy line having one end connected to said derrick body at an elevated point and having its other end anchored to said horizontal base, said guy line being of such length that said derrick body may be swung beyond vertical position away from the anchored end of said guy line while said supporting member is placed in position, and means for taking up slack in said guy line when said derrick body is supported on said supporting member.

6. A portable derrick structure comprising a substantially T-shaped supporting structure, the leg of the T being formed as a horizontal supporting base and the cross of the T being formed as a main substructure of substantial height on which the adjacent end of said horizontal base is supported, an auxiliary substructure supporting the other end of said horizontal base, an upstanding base carried on said supporting structure over the first named end of said horizontal base, said upstanding base having a front side facing away from said horizontal base and being formed of opposite pairs of upstanding legs, rigid members connecting the upper ends of the legs of each pair, a derrick body having front and rear legs, means pivotally connecting the lower ends of said front derrick legs to opposite sides of said upstanding base adjacent the front side thereof, and a rigid horizontal supporting member extending across the top of said upstanding base adjacent the back side thereof, said supporting member being arranged in such position that the lower ends of the back derrick legs will rest thereon when said derrick body is in vertical position.

7. A derrick structure constructed in accordance with claim 6 provided with a guy line connected at one end to said derrick body adjacent its upper end and having its other end anchored to said horizontal base at a point remote from said derrick body, said guy line being of such length that said derrick is adapted to swing beyond vertical position for the placing in position of said supporting member, means for swinging said derrick from horizontal position to said vertical position and therebeyond with movement of the derrick body beyond vertical position limited by said guy line, and means for taking up slack in said guy line when the back legs of said derrick are resting on said supporting member.

8. A portable derrick structure comprising a supporting structure including an upstanding base having a front side and a back side, said supporting structure including projecting horizontal portions extending substantially beyond the other sides of said base, a derrick body having a front side and a back side and having its lower end supported on said base, a fourble board carried by said derrick body at a point spaced from the lower end thereof and projecting beyond the front side thereof, and guy means connecting the projecting portion of said fourble board to the upper end of said derrick and to the projecting portion of said supporting structure outwardly of said base.

9. A portable derrick structure comprising a supporting structure including an upstanding base having spaced opposite pairs of legs, a derrick body, pivot means connecting one side of said derrick body to two opposite legs of said pair, means for supporting the opposite side of said derrick on said upstanding base, said supporting structure having projecting portions extending horizontally substantially beyond the other sides of said derrick body, a fourble board connected to said derrick body a substantial distance from the bottom thereof and projecting from the first named side thereof, and guy means connecting the projecting portion of said fourble board to the upper end of said derrick and to the projecting portions of said substructure at points spaced from said upstanding base.

10. Apparatus constructed in accordance with claim 9 wherein said guy means comprises a pair of guy wires connected to the projecting portion of said fourble board and converging upwardly to the upper end of said derrick, and a pair of guy wires connected at their upper ends to said fourble board and diverging downwardly, the other ends of the last named guy wires being connected to the projecting portions of said supporting structure at points spaced from said base and spaced from the first named side of said derrick body toward said opposite side thereof.

11. A portable derrick structure comprising a supporting structure, a derrick body projecting upwardly therefrom, a pair of alined spaced pivot pins connecting one side of said derrick body to said supporting structure, said supporting structure being constructed to receive therein the bottom portion of the derrick body when the latter is swung about the axis of said pivot pins to a substantially horizontal position, a raising boom arranged between and pivotally supported by said pins, means for transmitting forces to the free end of said boom and from such end of said boom to said derrick to raise the latter to a vertical position, and means for supporting the bottom of the opposite side of said derrick body on said supporting structure when the derrick body is raised to vertical position.

12. Apparatus constructed in accordance with claim 11 provided with a guy line extending from the upper end of said derrick body to a point spaced from the bottom portion of the derrick body and anchored at the latter point, said guy line being of such length that the transmission of the force from said boom to said derrick body will swing the derrick body beyond vertical position with said guy line acting to limit such swinging movement to a position with said derrick moved slightly beyond vertical position for the placing in position of said supporting means, and means for taking up the slack in said guy line when the bottom of said opposite side of said derrick body is supported on said supporting means.

13. A portable derrick structure comprising an upstanding base having spaced opposite pairs of legs, a derrick body having a front side and a back side, alined pivot pins connecting the lower end of the front side of said derrick to the top of said base, said base and the bottom portion of said derrick body being constructed and arranged with respect to each other for the entrance of such lower portion of the derrick into the space between said pairs of legs when said derrick is swung downwardly about said pivot pins in the direction of the back side of the derrick body, a raising boom constructed and arranged to be releasably pivotally supported by said pivot pins, means for transmitting forces to the free end of said raising boom and from such end of the raising boom to said derrick body when the latter is in lower position to effect the raising thereof, and means for supporting the back side of said derrick body on the corresponding side of said upstanding base when said derrick is in vertical position.

14. Apparatus constructed in accordance with claim 13 provided with a guy line having one end connected to the top of said derrick and the other end anchored at a point spaced from said base in the direction of swinging movement of said derrick, said guy line being of such length that the application of a force to the upper end of said derrick body from said boom will swing the boom upwardly to and beyond vertical position with said guy line limiting such movement of the derrick body, whereby said supporting means may be placed in position, and means for taking up the slack in said guy line when the bottom of the back side of said derrick body is resting on said supporting means.

ROBERT E. McCARTHY.
EMIL A. BENDER.